United States Patent [19]

Robert

[11] Patent Number: 5,566,717

[45] Date of Patent: Oct. 22, 1996

[54] ASSEMBLY FOR CONTROLLING FLUID PASSING THROUGH A MANIFOLD

[75] Inventor: Michael E. Robert, Farmington Hills, Mich.

[73] Assignee: Mac Valves, Wixom, Mich.

[21] Appl. No.: 417,746

[22] Filed: Apr. 6, 1995

[51] Int. Cl.⁶ .................................................. F16K 11/00
[52] U.S. Cl. .................................... 137/883; 137/487.5
[58] Field of Search ............................. 137/487.5, 883, 137/884

[56] References Cited

U.S. PATENT DOCUMENTS

| | | | |
|---|---|---|---|
| 4,191,215 | 3/1980 | Gonner | 137/870 |
| 4,640,310 | 2/1987 | Hartle et al. | 137/487.5 X |
| 4,664,155 | 5/1987 | Archung et al. | 137/883 X |
| 4,870,994 | 10/1989 | Raymond | 137/883 X |
| 5,318,072 | 6/1994 | Goedecke | 137/487.5 X |

*Primary Examiner*—John C. Fox
*Attorney, Agent, or Firm*—Bliss McGlynn, P.C.

[57] ABSTRACT

A fluid flow assembly controls fluids passing through a secondary or communication line of a manifold. The manifold includes at least one output port connected in fluid communication with the secondary line. A fluid supply is connected to a fill valve controlled by an electronic feedback control. An exhaust valve is also controlled by the electronic feedback control. Together, the fill and exhaust valves regulate the pressure of the fluid flow through the secondary line and the valves associated with each of the output ports.

4 Claims, 2 Drawing Sheets

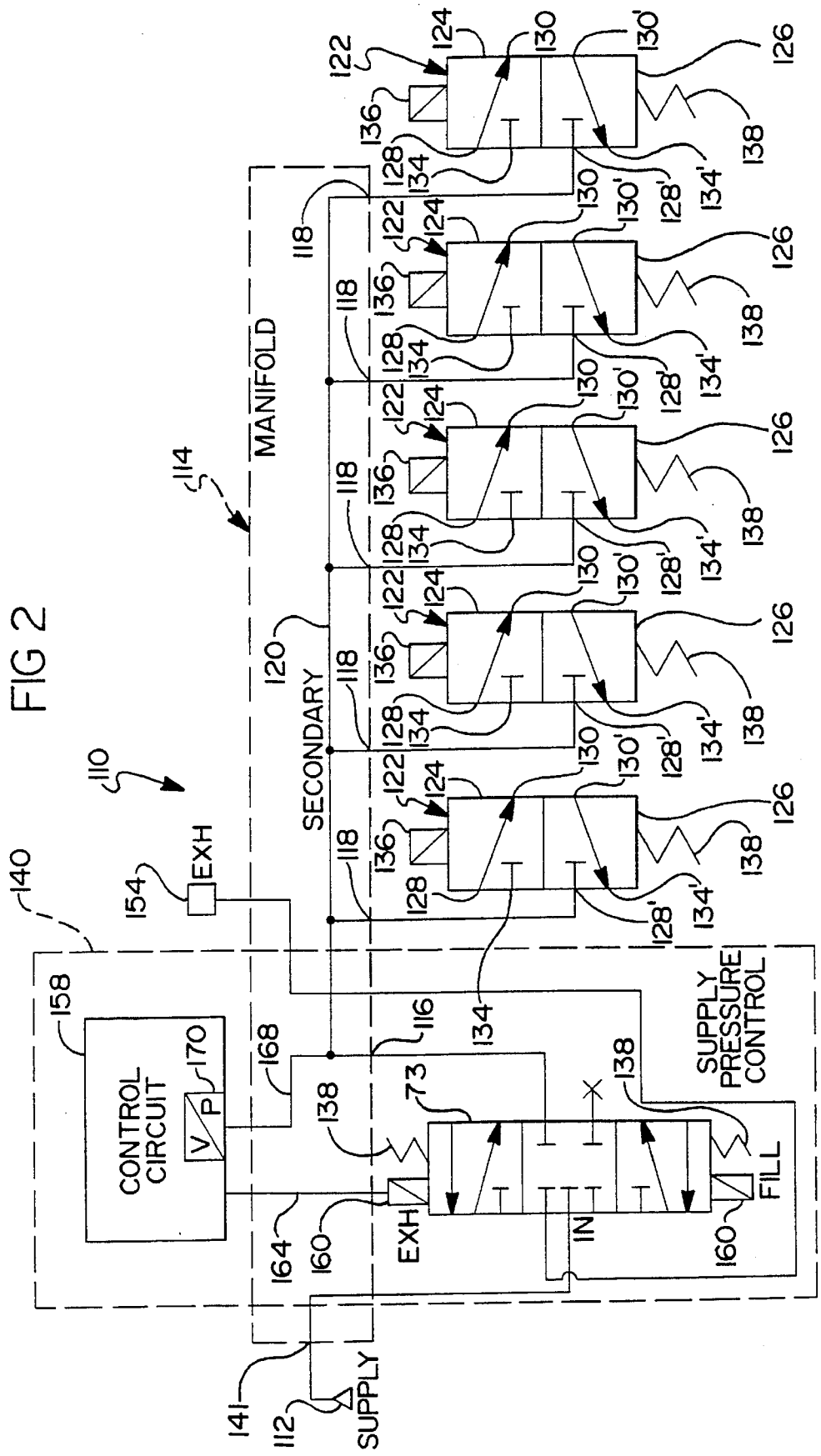

ASSEMBLY FOR CONTROLLING FLUID PASSING THROUGH A MANIFOLD

BACKGROUND OF THE INVENTION

1. Field of the Invention

The invention relates to manifold controls. More particularly, the invention relates to a manifold control assembly using valves to precisely control the fluid pressure of the fluid sent through the manifold.

2. Description of the Related Art

Manifolds have valves and other equipment mounted thereto which are used to control and move a plurality of parts or elements of a machine or apparatus. Fluid, such as compressed air, is gathered at a set pressure and sent through an inner channel in the manifold to various valve inlet ports where the compressed air can supply the mounted valves and equipment. Valves at each valve inlet port determine through which of the valve inlet ports the compressed air is to pass.

A mechanical regulator is typically used to regulate the pressure of the supplied compressed air as it is sent through the manifold. An example of a regulator in combination with a manifold is disclosed in U.S. Pat. No. 4,191,215 issued to Gonner on Mar. 4, 1980. The pressure regulator is connected between the inlet port and the manifold.

Two problems associated with using a mechanical regulator are both its size and its cost. A mechanical regulator requires a relatively large space to be precise. This proportional relationship places demands on space which is generally a commodity in the industrial settings. The precision mechanical regulator is also an expensive piece of equipment requiring additional assembly cost to the valve manifold.

SUMMARY OF THE INVENTION

A fluid flow assembly comprises a manifold defining an input port and a plurality of output ports. The manifold further includes a communication line extending from the inlet port to each of the plurality of output ports for providing fluid communication therebetween. A valve assembly is in fluid communication with the inlet port for receiving fluid from a fluid supply. An electronic control is electrically connected to the regulating valve and controls the regulating valve such that the regulating valve operates between an open condition and a closed condition to provide a predetermined pressure of the fluid to the communication line.

The advantage associated with the invention includes the ability to provide a precise, inexpensive regulating system for a manifold. The valve system, in combination with the electronic control, consumes less space and is cheaper than the regulator assembly which would be required to do the pressure regulating job of the invention.

BRIEF DESCRIPTION OF THE DRAWINGS

Other features and advantages of the present invention will be readily appreciated as the same becomes better understood after reading the subsequent description when considered in connection with the accompanying drawings, wherein:

FIG. 2 is a schematic diagram of an alternative embodiment of the present invention.

DETAILED DESCRIPTION OF THE DRAWINGS

Figure 1:
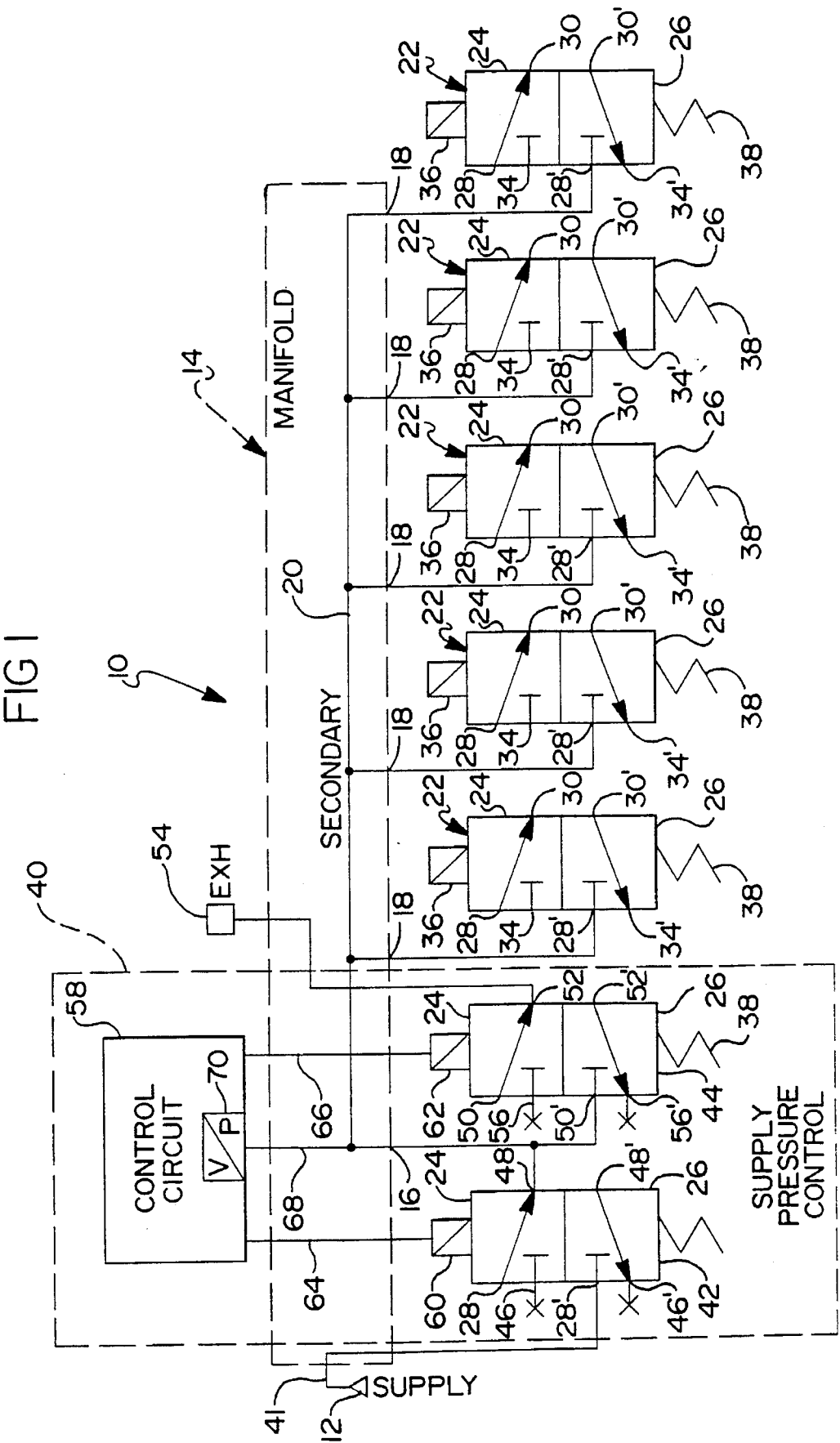
FIG. 1 is a schematic diagram of the preferred embodiment of the present invention.

Referencing FIG. 1, a fluid flow assembly is generally shown at 10. The fluid flow assembly 10 receives a fluid from a fluid supply 12 and distributes the fluid to a plurality of points; five are shown in the drawing. It would be obvious to those skilled in the art that any number of points of distribution may be used.

The fluid flow assembly 10 includes a manifold 14 defining a secondary port 16 and a plurality of valve inlet ports 18. The secondary port 16 is in fluid communication with the fluid supply 12 through the fill valve 42. Fluid from the fluid supply 12 flows into the manifold 14 through the fill valve 42. The manifold 14 includes a secondary or communication line 20 which extends from the secondary port 16 to each of the plurality of valve inlet ports 18 and provides fluid communication therebetween. More specifically, fluid sent through the secondary port 16 may exit the manifold 14 through any one of the plurality of valve inlet ports 18. The manifold 14 is fabricated typically from metal or hard plastic and may be diecast or it may be extruded barstock, specially fabricated for a special use.

A valve, generally shown at 22, is in fluid communication with each of the plurality of valve inlet ports 18. The valve 22 is represented by a rectangle comprising two squares 24, 26. The top square 24 represents one state whereas the bottom square 26 represents another. In the top square 24, the valve 22 is open allowing fluid to flow from inlet port 28 to cylinder port 30. The arrow 32 represents the fluid flow from the inlet port 28 to the cylinder port 30. An exhaust port 34 is closed as is represented by the inwardly extending valve plunger.

In the bottom square 26, the valve is represented in the exhaust mode wherein fluid is flowing from the cylinder port 30' to an exhaust port 34'. The inlet port 28' is closed preventing fluid from flowing back into the valve inlet ports 18 of the manifold 14. The valve 22 as shown in the figure is a three way - two position valve. More specifically, the valve represented can be in two positions, i.e., open or exhausting, and fluid can flow in two different directions through the cylinder port from the inlet port 28 and through the exhaust port 34 from the cylinder port 30. The symbols described above are well known in the art. Further, other types of valves may be mounted to manifold 14.

The valve 22 further includes a solenoid 36 which is wired to a control system as is well known in the art (not shown) and operates the valve 22 moving the valve between the open and exhaust positions. A spring 38 spring biases the solenoid 36 such that the valve 22 will be in the closed position when the solenoid 36 is not activated.

The fluid flow assembly 10 includes a valve assembly 40 in fluid communication with a manifold inlet port 41. The valve assembly 40 receives fluid from the fluid supply 12 and sends it through the communication line 20 at a predetermined pressure. The valve assembly includes a fill valve 42 and an exhaust valve 44. The fill valve 42 is connected directly to the fluid supply 12. The exhaust port 46 is blocked, as represented by the X preventing fluid from ever exhausting the fill valve 42 thus converting it to a two way - two position valve. The output of the fill valve 42 through its cylinder port 48 is connected to the inlet port 50 of the exhaust valve 44. The cylinder port 52 of the exhaust valve 44 is in fluid communication with the exhaust outlet 54 to ambient air. As with the fill valve 42, the exhaust valve 44 includes an exhaust port 56 which is blocked, as represented by the X, to covert to a two way valve. The cylinder port 48 of the fill valve 42 is also connected to an electronic control 58, to be discussed subsequently. Further, the solenoids 60, 62 of the fill valve 42 and exhaust valve 44, respectively, are connected to the electronic control 58.

The fill valve 42 and exhaust valve 44 are both two way, two position valves, typically popper valves, of a construction known in the art. As an alternative to the preferred embodiment, the valve assembly 40 may replace the fill 42 and exhaust 44 valves with a single valve which is a four way, three position valve. Although this type of valve is more expensive, it may replace the fill 42 and exhaust 44 valves if the space is required for other components.

The electronic control 58 is electrically connected to the valve assembly 40 for controlling the valve assembly 40 such that the valve assembly 40 opens and closes to provide a predetermined pressure of fluid to the communication line 20. The electronic control is electrically connected to the solenoids 60, 62 of the fill 42 and exhaust 44 valves via lines 64, 66. The electronic control 58 determines when each of the solenoids 60, 62 is to operate each of the valves 42, 44. The electronic control 58 includes a feedback loop 68 for receiving pressure from the fill valve 42 to control the fill valve 42 and the exhaust valve 44. More specifically, the feedback loop 68 is connected directly with the cylinder port 48 of the fill valve 42. The pressure signal received in the feedback loop 68 is converted to a voltage signal through the pressure voltage transducer 70. Since the cylinder port 48 of the fill valve 42 is in direct communication with the communication line 20, the voltage signal created by the pressure voltage transducer 70 is an accurate representation of the pressure in the communication line 20 and, therefore, an accurate representation of the pressure at each of the plurality of valves 22. Examples of the electronic control 58 are disclosed in copending patent applications (having U.S. Ser. No. 371,766 and U.S. Ser. No. 371,769) filed on Jan. 12, 1995 which are hereby expressly incorporated by reference.

Turning to FIG. 2, a second embodiment is shown at 100, wherein numerals offset by one hundred represent structure similar to the first embodiment about which no additional discussion will be presented. A single four way - three position valve 73 replaces the three way - two position fill and exhaust valves of the first embodiment. The four way - three position valve includes two springs 138, which spring bias two solenoids 160 which act to open and close the various ports. Although the four way - three position valve 73 operates in a fashion similar to the three way - two position valves, it requires less space which may be desirable in certain environments. It will be appreciated by those skilled in the art that any number of different types of valves and valve combinations may be used.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

I claim:

1. A fluid flow assembly comprising:

a manifold defining an input port and a plurality of output ports, said manifold further including a communication line extending from said input port to each of said plurality of output ports for providing fluid communication therebetween; and a valve assembly in fluid communication with said input port for receiving fluid from a fluid supply, said valve assembly including an electronic control electrically connected to said valve assembly for controlling said valve assembly such that said valve assembly opens and closes to provide a predetermined pressure of the fluid to said communication line, said valve assembly further including a fill valve and an exhaust valve, said fill and exhaust valves being two position two way valves having inlet, exhaust and cylinder ports.

2. A fluid flow assembly as set forth in claim 1 wherein said valve assembly further includes an electronic control for controlling said fill valve and said exhaust valve, said electronic control including a feedback loop and a pressure voltage transducer to convert pressure received from said fill valve into an electrical signal, said electronic control electrically connected to said fill valve and said exhaust valve such that said valve assembly opens and closes to provide a predetermined pressure of the fluid to said communication line.

3. A fluid flow assembly as set forth in claim 2 further characterized by said valve assembly including two plugs, each of said plugs being secured to each of said exhaust ports of said fill valve and said exhaust valve to prevent fluid from passing therethrough.

4. A fluid flow assembly as set forth in claim 1 further characterized by each of said plurality of valves including a solenoid to open each of said plurality of valves and a spring to close each of said plurality of valves.

* * * * *